(12) United States Patent
Rephlo (10) Patent No.: US 10,121,296 B1
(45) Date of Patent: Nov. 6, 2018

(54) SECURE DELIVERY VIA UNMANNED VEHICLES

(71) Applicant: CAPITAL ONE SERVICES, LLC, McLean, VA (US)

(72) Inventor: Jeremy Rephlo, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/035,433

(22) Filed: Jul. 13, 2018

Related U.S. Application Data (63) Continuation of application No. 15/904,021, filed on Feb. 23, 2018, now Pat. No. 10,055,915, which is a continuation of application No. 15/337,659, filed on Oct. 28, 2016, now Pat. No. 9,934,630.

(60) Provisional application No. 62/249,174, filed on Oct. 30, 2015.

(51) Int. Cl.
*G07C 9/00* (2006.01)

(52) U.S. Cl.
CPC .................. *G07C 9/00087* (2013.01)

(58) Field of Classification Search
CPC ............ G07C 9/00309; G07C 9/00103; G07C 9/00111; G07C 9/00571; G07C 2009/00793; G07C 9/00166
USPC .......................................................... 340/5.2
See application file for complete search history.

(56) References Cited

U.S. PATENT DOCUMENTS

| | | | |
|---|---|---|---|
| 9,292,705 B2 | 3/2016 | Lemmey et al. | |
| 9,334,052 B2 | 5/2016 | Pasko et al. | |
| 9,384,668 B2 | 7/2016 | Raptopoulos | |
| 9,412,279 B2 | 8/2016 | Kantor et al. | |
| 9,561,852 B1 * | 2/2017 | Beaman | B64D 1/00 |
| 9,646,283 B2 * | 5/2017 | Kantor | G08G 5/0013 |
| 9,663,226 B2 | 5/2017 | Canavor et al. | |
| 9,671,790 B2 | 6/2017 | Srivastava et al. | |
| 9,714,088 B2 | 7/2017 | Canavor et al. | |
| 9,733,644 B2 | 8/2017 | Levien et al. | |
| 9,777,502 B2 | 10/2017 | Curlander et al. | |
| 9,778,653 B1 | 10/2017 | McClintock et al. | |
| 2016/0068264 A1 | 3/2016 | Ganesh et al. | |
| 2016/0285863 A1 | 9/2016 | Canavor et al. | |
| 2016/0285864 A1 | 9/2016 | Canavor et al. | |
| 2017/0270314 A1 | 9/2017 | Tsybrovskyy et al. | |

FOREIGN PATENT DOCUMENTS

WO  WO 2016/039882 A1  3/2016

* cited by examiner

*Primary Examiner* — Mark Blouin
(74) *Attorney, Agent, or Firm* — Finnegan, Henderson, Farabow, Garrett & Dunner LLP (57) ABSTRACT

Systems and methods are provided for on-demand delivery of a payload by an unmanned vehicle. An unmanned vehicle may comprise a chamber configured to house a payload and adjust a payload state. The payload state may be adjusted based on detection of a tampering event. An unmanned vehicle may also comprise an authentication system configured to allow access to the payload.

20 Claims, 5 Drawing Sheets

SECURE DELIVERY VIA UNMANNED VEHICLES

RELATED APPLICATIONS

This application is a continuation of U.S. patent application Ser. No. 15/904,021 filed on Feb. 23, 2018 (now allowed), which is a continuation of U.S. patent application Ser. No. 15/337,659, filed on Oct. 28, 2016, now U.S. Pat. No. 9,934,630, which claims priority from U.S. Provisional Patent Application No. 62/249,174, filed on Oct. 30, 2015. The aforementioned applications are incorporated herein by reference in their entireties.

TECHNICAL FILED

The present disclosure provides an unmanned vehicle for secure delivery of items, and a system and method for controlling the unmanned vehicle to perform the secure delivery.

BACKGROUND

Consumers desire instant, on-demand access to their money, banking services, and important documents. In some situations, vendors may demand cash payment from consumers, but a consumer may not have any cash on hand. A consumer may then have to search for an automated teller machine (ATM) near their location, and may be forced to pay ATM fees if they use an ATM that is not associated with their banking institution. Furthermore, once a consumer finds an ATM, there is a risk that ATM lines are long or that the ATM is not functioning. Additionally, ATMs pose security risks due to so called ATM skimming, where thieves use hidden electronics to steal personal information stored on a credit or debit card at an ATM. Other security risks include an increased likelihood of individuals viewing your personal information while you use an ATM.

Consumers also may misplace their credit or debit card, have their credit or debit card stolen, or be subjected to account fraud. In such instances, a consumer's banking institution may send the consumer a replacement credit or debit card through the postal service, or the consumer may travel to a local banking location to receive a replacement card. But these actions are time consuming, and prevent the consumer from easily accessing money. Furthermore, delivery of replacement credit and debit cards poses an increased cost and security risk because human delivery may be required.

Consumers may also require fast delivery of important documents and financial instruments. For example, a consumer may need to sign a contract before a deadline, or need a cashier's check to make a payment. But delivery of contracts and other important documents can be time consuming and expensive because human delivery may be required, and may also have security risks.

Furthermore, delivery systems may have security concerns that may not adequately prevent fraud. For example, a hand signature may be required for hand delivery of important documents, but such hand signatures are prone to forgery.

In view of the shortcomings of current systems and methods for providing access to money, banking services, and important documents, an on-demand, quick, secure, and convenient mechanism for providing access to money, banking services, and important documents is desired.

SUMMARY

Disclosed embodiments provide systems and methods for secure delivery of cash, other financial instruments, and other documents and items via unmanned vehicles.

Consistent with embodiments, unmanned vehicles for on-demand delivery are provided. An unmanned vehicle may include a navigation system for managing travel routes and a chamber configured to house a payload and adjust a payload state. The payload state may be adjusted based on detection of a tampering event. The unmanned vehicle may also include an authentication system configured to allow access to the payload.

Consistent with embodiments, methods for on-demand delivery are also provided. A method may include housing a payload in a chamber of an unmanned vehicle configured to adjust a payload state. The method may also include providing access to the payload based on a determination by an authentication system.

Consistent with embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

The disclosed embodiments are directed to systems and methods for providing secure delivery via unmanned vehicles. In particular, systems and methods provide an unmanned vehicle for on-demand delivery comprising a chamber configured to house a payload. The unmanned vehicle may also comprise an authentication system configured to allow access to the payload.

In some embodiments, authentication may include verification of a recipient's identity using debit or credit card swipe, personal identification number, facial scanning, fingerprint scanning, retinal scanning, voice recognition, heart beat patterns, possession of a certain device, and the like.

In some embodiments, systems and methods may further provide an unmanned vehicle with a payload chamber configured to adjust a payload state. The payload state may be adjusted, for example, based on detection of a tampering event. A tampering event may indicate attempts to hack or gain control of an unmanned vehicle by an unauthorized party, or attempts to steal or destroy a payload of the unmanned vehicle. In some embodiments, a tampering event may include a loss of altitude of the unmanned vehicle, unexpected movement of the unmanned vehicle, a communication loss between the unmanned vehicle and a control center, etc. A tampering event may also include detection of a number of failed authentication events that meets or exceeds a predetermined threshold, a power loss of the unmanned vehicle, damage to the unmanned vehicle, and the like. In some embodiments, adjusting the payload may include destroying the payload, marking the payload, or voiding a payload.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
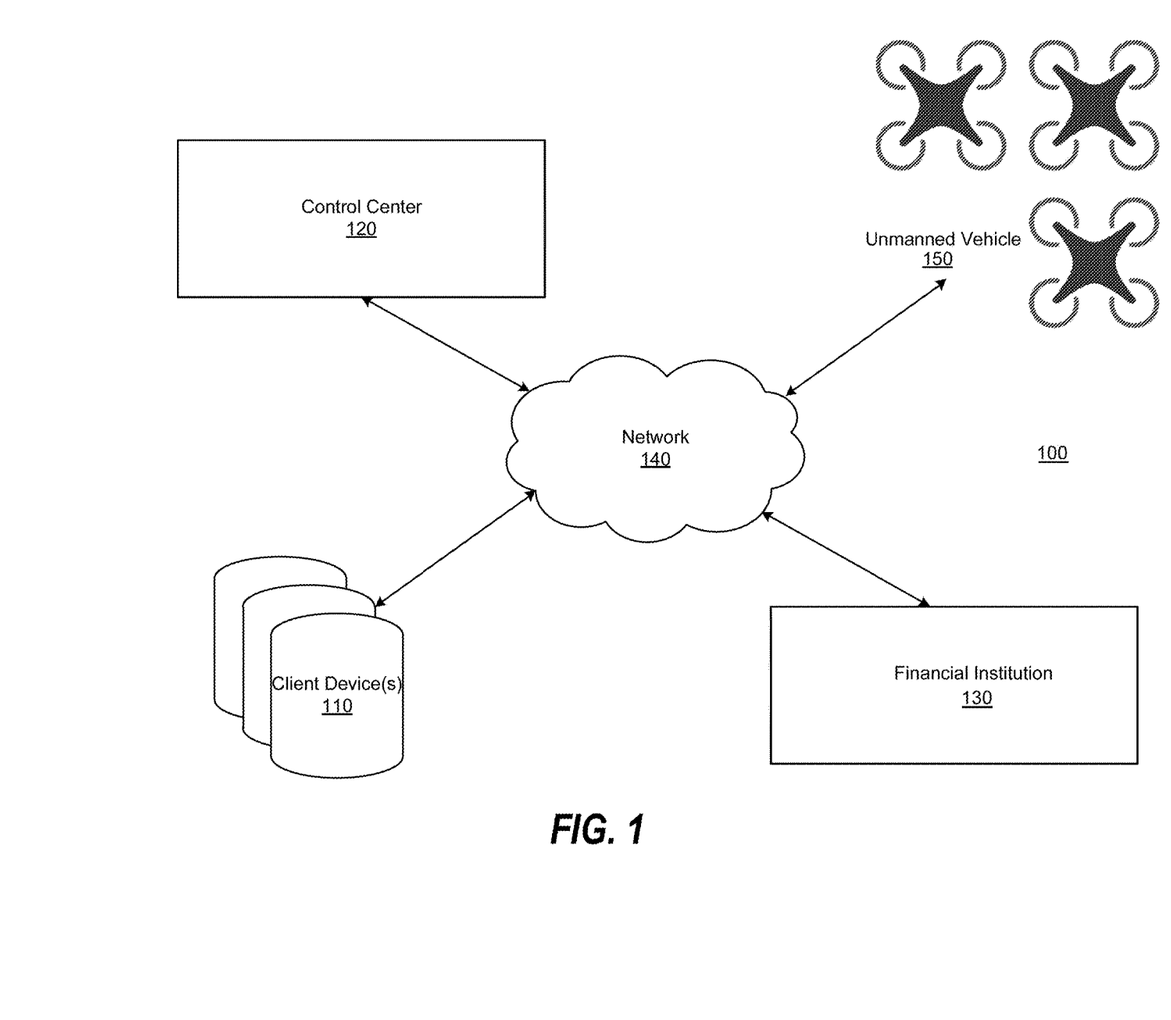
FIG. 1 is a diagram of an exemplary system that may be used to implement secure delivery via unmanned vehicles, consistent with disclosed embodiments.

FIG. 1 is a diagram of an exemplary system that may be used to implement secure delivery via unmanned vehicles, consistent with disclosed embodiments. In particular, FIG. 1 shows a diagram of an exemplary system 100, consistent with disclosed embodiments, revealing some technical aspects of the present disclosure for achieving the intended results of the present disclosure. System 100 may be implemented to, for example, implement secure delivery via unmanned vehicles.

As shown in FIG. 1, system 100 may include at least one client device 110, a control center 120, a financial institution 130, a network 140, and at least one unmanned vehicle 150. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

Client device 110 may be operated by a user to request unmanned delivery of cash or other financial instruments from financial institution 130, consistent with disclosed embodiments. Client device 110 may be implemented using a variety of different equipment, such as personal computers, vehicle computers, servers, mainframes, mobile devices, personal digital assistants (PDAs), smartphones, cell phones, smart-watches, smart-spectacles, tablets, thin clients, and the like. Client devices 110 may be connected to a network such as network 140.

Control center 120 may control, track, and otherwise monitor the status of the at least one unmanned vehicle 150. Control center 120 may be in communication with unmanned vehicle 150, one or more financial institutions 130, and client device 110. Control center 130 may track all locations of unmanned vehicles, whether unmanned vehicles are traveling to delivery locations or waiting for loading with a payload. Control center 120 may also be communication with armed forces and emergency personnel (not shown), such as medical, police, and fire services.

Control center 120 may be implemented as one or a collection of personal computers, vehicle computers, servers, mainframes, mobile devices, PDAs, smartphones, cell phones, smart-watches, smart-spectacles, tablets, thin clients, and the like. Control center 120 may be connected to a network such as network 140.

Financial institution 130 may be implemented as brick-and-mortar location of a bank; a depository of cash; a credit and debit card manufacturer; a distribution center which may have an inventory of financial products, such as financial cards/replacement cards, checks/replacement checks, documents, or an inventory of goods; a check printing facility; a document printing facility; a document repository; etc.

Network 140, in some embodiments, may comprise one or more interconnected wired or wireless data networks that receive data from one device (e.g., client device 110) and send it to another device (e.g., unmanned vehicle 150). For example, network 140 may be implemented as the Internet, a wired Wide Area Network (WAN), a wired Local Area Network (LAN), a wireless LAN (e.g., Institute of Electrical and Electronics Engineers (IEEE) 802.11, Bluetooth, etc.), a wireless WAN (e.g., Worldwide Interoperability for Microwave Access (WiMAX)), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, a satellite link, and the like.

Unmanned vehicle 150 may be implemented as an unmanned aerial vehicle (UAV), unmanned land vehicle, or unmanned water vehicle. For example, unmanned vehicle 150 may be implemented as an unmanned automobile, motorcycle, armored vehicle, emergency vehicle, tank, law enforcement vehicle, or any other land-based vehicle. Unmanned vehicle 150 may also be implemented as an unmanned speedboat, pontoon, or any other water based vehicle. Further, unmanned vehicle 150 may also be implemented as an aerial drone, commercial jet, airliner, or any other aerial vehicle. It should be noted that an unmanned vehicle may comprise a vehicle that has an area for human passengers to sit, but is unmanned in the sense that control of the vehicle is autonomous and is not performed by a human.

Unmanned vehicle 150 may comprise a chamber. The chamber may be configured to house a payload and adjust a payload state based on detection of a tampering event. Unmanned vehicle 150 may also comprise an authentication system configured to allow access to the payload.

Payload may be one or more of cash, credit or debit cards, checks, cashier's checks, money orders, bullion, contracts, liens, important documents, sensitive documents, or any other item capable of being delivered. For example, payload may comprise a home loan closing document. Payload may also be any other items belonging to a user, such as items kept in a safety deposit box, for example. Payload may also be a welcome kit or new credit or debit card associated with a new bank account opened via a web portal.

Each component in system 100 may communicate bidirectionally with other system 100 components either through network 140 or through one or more direct communication links (not shown). For ease of discussion, FIG. 1 depicts only particular devices being connected to network 140. In some embodiments, however, more or fewer devices may be connected to network 140.

Figure 2:
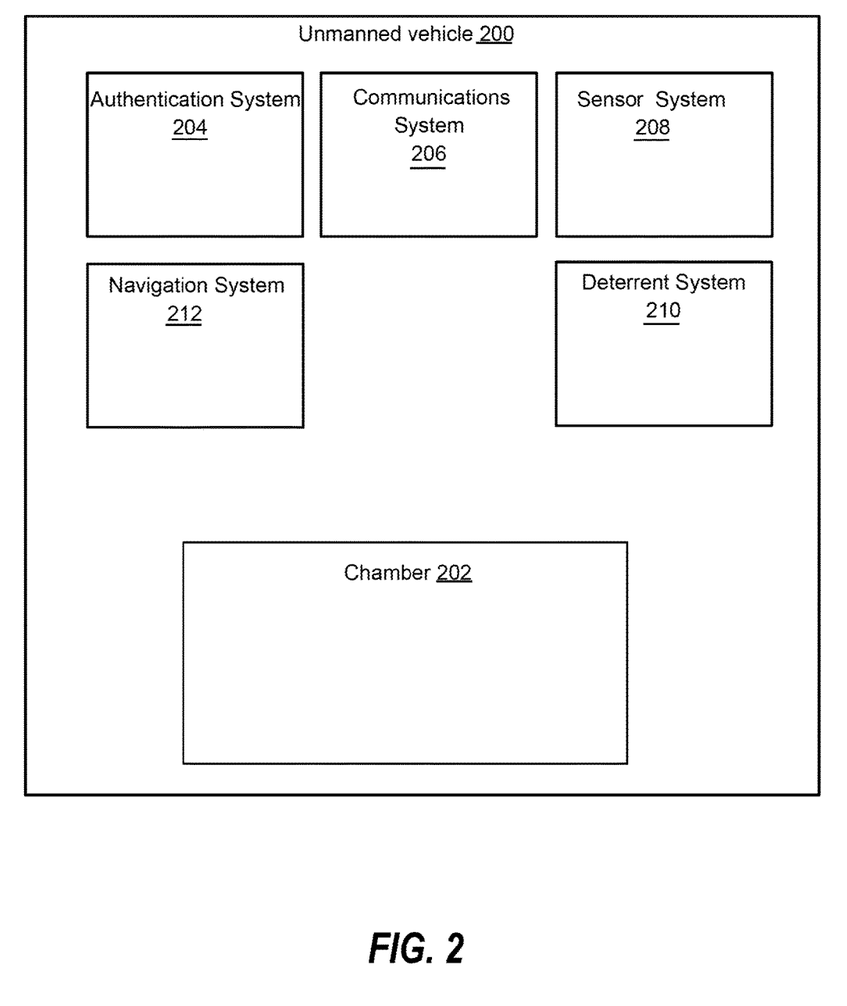
FIG. 2 is a diagram of an exemplary unmanned vehicle, consistent with disclosed embodiments.

FIG. 2 is a diagram of an exemplary unmanned vehicle 200 configured to perform functions consistent with disclosed embodiments. For example, unmanned vehicle 200 may be similar to unmanned vehicle 150 used in system 100 (FIG. 1).

Unmanned vehicle 200 may comprise a chamber 202, an authentication system 204, a communication system 206, a sensor system 208, a deterrent system 210, and a navigation system 212.

Chamber 202 may comprise a structure configured to house a payload. For example, chamber 202 may be fitted with a locking mechanism to lock a payload inside, and may be fireproof, waterproof, and/or include impact protection, for example.

Chamber 202 may also be configured to adjust a state of a payload. For example, chamber 202 may be fitted with shredding and/or burning capabilities that allow chamber 202 to adjust a state of a payload by shredding or burning the payload upon detection of, for example, a tampering event associated with chamber 202. Additionally or alternatively, chamber 202 may be configured with marking capabilities to adjust a state of a payload by marking the payload with a symbol or lettering or staining a payload. In some embodiments, chamber 202 may be configured with demagnetizing capabilities to adjust a state of a payload by demagnetizing the payload. For example, chamber 202 may be configured to demagnetize the magnetic strip of a financial transaction card, rendering the card unusable.

Authentication system 204 may be used to regulate access to a payload stored in chamber 202. For example, authentication system 204 may verify an identification of a user attempting to access the payload stored in chamber 202. Once identification is verified, authentication system 204 may allow access to the payload.

Authentication system 204 may include any one or a combination of cameras or video cameras, including high definition, ultra high definition, infrared, thermal, night vision, and stereoscopic cameras. In addition or instead, authentication system 204 may include Quick Response (QR) codes that require scanning by an authenticated device, debit and credit card swipe, personal identification numbers, password entry systems, and the like. Authentication system 204 may also include biometric scanners, such as fingerprint scanners, facial scanners, iris scanners, voice scanners, heartbeat recognition devices, etc.

Communication system 206 may include modules configured to communicate with client devices, control centers, financial institutions, and the like. For example, communication system 206 may send data representative of a travel condition and location to a control center so the control center can determine a status of the unmanned vehicle. Communication system 206 may receive data from a control center, such as coordinates for delivery, tampering event data, and any other data.

Sensor system 208 may include sensors configured to measure altitude, velocity, bearing, acceleration, rotation, pitch, roll, yaw, and the like. For example, sensor system 208 may comprise an accelerometer, gyroscope, and altimeter. Sensor system 208 may also include sensors configured to measure temperature, wind, and the like.

Deterrent system 210 may be configured to provide both travelling and stationary security and anti-theft features. Travelling security and anti-theft features may include a projectile defense system that attempts to cause misdirection of, for example, missiles launched at the unmanned vehicle. Travelling security and anti-theft features may also include weaponry designed to ward off security threats, such as small arms and artillery. Travelling security and anti-theft features may also include equipment that prevents radar jamming, communication jamming, and the like.

Stationary security and anti-theft features may include features that activate once the unmanned vehicle has stopped traveling, e.g., once it has reached its destination. For example, stationary security and anti-theft features may include pepper spray or tear gas that activates when a tampering event is detected.

Navigation system 212 may include sensors configured to determine location, such as global position system (GPS) sensors. Navigation system 212 may be programmed with travel routes, coordinates, and the like. Navigation system 212 may be updated with current traffic, weather conditions, and the like, and may adjust travel routes based on such conditions.

Figure 3:
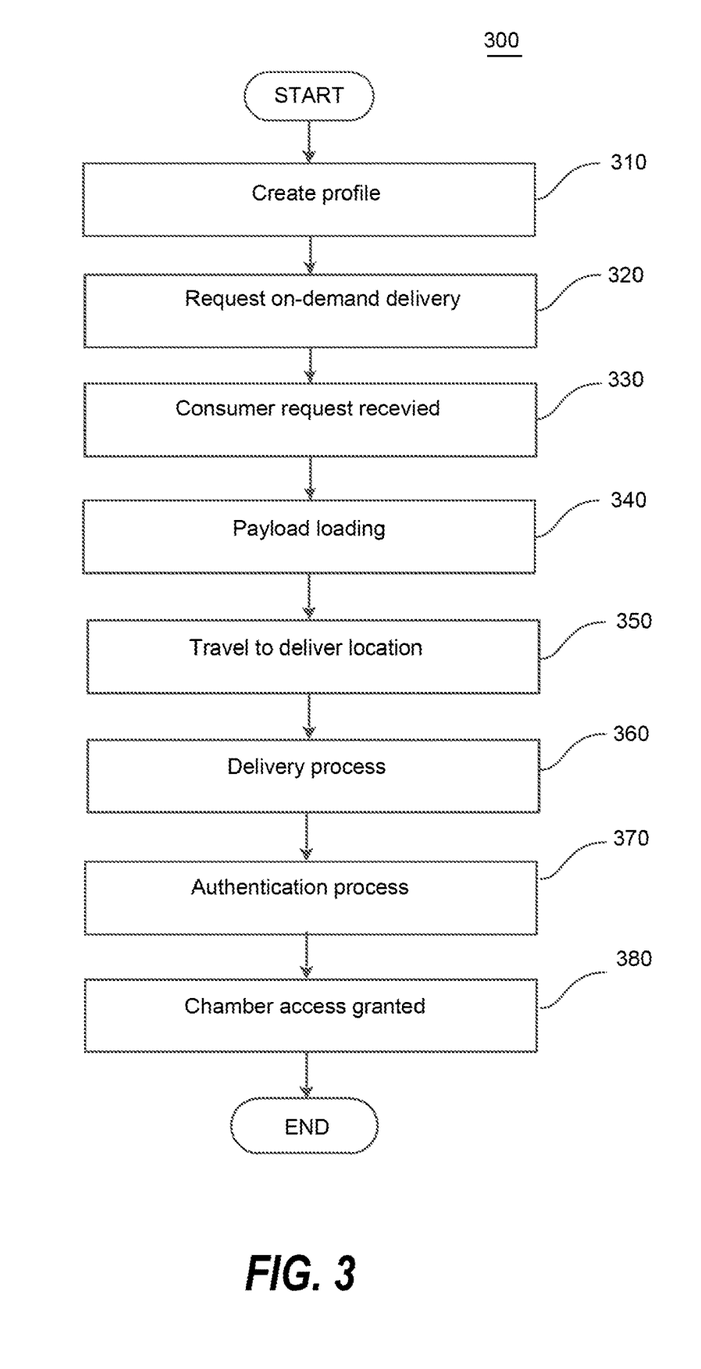
FIG. 3 is a flowchart of an exemplary process for secure delivery via unmanned vehicles, consistent with disclosed embodiments.

FIG. 3 is a flowchart of an exemplary process 300 for secure delivery via unmanned vehicles, consistent with disclosed embodiments. Referring to FIG. 3, process 300 will be described in connection to system 100.

At step 310, a consumer may create a profile. The profile may include information usable for allowing access to the chamber of unmanned vehicle 150 during delivery. For example, the consumer may enter personal information such as name, address, age, height, weight, eye color, hair color, and the like. A consumer may also enter a personal identification number, credit and debit card information, and select security questions and answers. A consumer may upload a picture of their face, body, or other distinguishing features, such as retinal pictures. A consumer may also record biometric data such as a voice access message, a finger print scan, a heartbeat pattern, etc. Once a consumer has created a profile, information from the profile may be used to authenticate a consumer and allow the consumer to access a payload of a chamber of unmanned vehicle 100.

At step 320, a consumer may request on-demand delivery through, for example, client device 110. The request may be made through an application, user interface, or the like executing on client device 110, and may be provided by an institution associated with the consumer or control center 120, over network 140. The consumer's created profile may be associated with the application, user interface, or the like executing on client device 110. The institution may be financial institution 130, repository, or any other institution associated with the consumer.

The request may specify a type of payload requested for on-demand delivery. For example, a consumer may request an amount of cash, replacement credit or debit card, personal check, cashier's check, contract, or other document for on demand delivery.

The request may specify a location for delivery. For example, a consumer may specify location for delivery to be the consumer's home address, current location, an address to which the consumer is traveling, an address of a family member or friend, or any other location selected by the consumer. The consumer may also specify location-tracking delivery, where the delivery location is tied to the consumer's tracked location. For example, if a consumer is traveling, unmanned vehicle 150 may track the consumer's location through communication with the consumer's client device 110, follow the consumer until the consumer's travel path meets the travel path of unmanned vehicle 150, and then deliver the payload to the consumer. In another example, if a consumer is traveling in a vehicle and requests location-tracking delivery, unmanned vehicle 150 may land and dock on the vehicle in which the consumer is traveling, and authentication may be implemented via an on-board computer of the consumer's vehicle.

The request may specify a time for delivery. For example, a consumer may request delivery for as soon as possible, or schedule delivery for a specific time and date.

The request may specify a type of unmanned vehicle 150 used in delivery. For example, a consumer may specify that the delivery is desired to be carried out by an aerial unmanned vehicle 150, a land-based unmanned vehicle 150, or a water-based unmanned vehicle 150. In some cases, control center 120 may ignore the type of unmanned vehicle 150 requested by the consumer if the requested type of unmanned vehicle 150 is unavailable, if conditions prohibit efficacy of the requested type, or the like. For example, in stormy and windy weather conditions, control center 150 may determine that all aerial unmanned vehicles 150 are grounded and unavailable for delivery due to increased risk of damage and delivery failure.

Speed of delivery may determine the type of unmanned vehicle 150 used in delivery. Thus, in some embodiments, traffic conditions may determine the type of unmanned vehicle 150 used in delivery. For example, if the real time traffic is determined to be congested, control center 120 may determine that aerial or water based unmanned vehicles 150 are preferred for delivery.

Local regulations and laws may determine the type of unmanned vehicle 150 used in delivery. For example, if a requested delivery area or travel route includes areas that prohibit aerial unmanned vehicles 150, control center 120 may determine that water based or land based unmanned vehicles 150 are preferred for delivery.

A request may be edited by the consumer at any time before delivery of the payload. For example, the consumer may edit the type of payload requested, location requested, time of delivery requested, and/or type of unmanned vehicle 150 for delivery.

At step 330, control center 120 may receive the consumer request for on-demand delivery. Based on the request, control center 120 may determine available unmanned vehicles 150, and select a particular unmanned vehicle 150 to provide the delivery in accordance with the consumer's request. Request data which specifies, for example, payload type, payload loading location, delivery location, and delivery time, may be communicated to the selected unmanned vehicle 150. The selected unmanned vehicle 150 may then travel to the payload loading location for payload loading in a chamber of the selected unmanned vehicle 150.

For example, a number of unmanned vehicles 150 may be positioned at various locations in a city or town. After receiving a consumer request, control center 120 may select an available unmanned vehicle 150 and direct the selected unmanned vehicle 150 to travel to a location for loading of the requested payload. In one embodiment, control center 120 may communicate a command to an available unmanned vehicle 150 located closest to the payload loading location to provide delivery.

In another example, one or more unmanned vehicles 150 may be pre-loaded with a one or more payloads. Such unmanned vehicle(s) 150 may navigate within a region or remain stationary at a location within a region when not responding to a consumer request. After receiving a consumer request for delivery of a payload present in one of the one or more pre-loaded unmanned vehicles 150, control center 120 may select a pre-loaded unmanned vehicle 150 containing the requested payload and direct the selected unmanned vehicle 150 to travel to a consumer location for quick delivery.

In another example, one or more unmanned vehicles 150 may be pre-loaded with one or more predetermined payloads, such as cash. The unmanned vehicles 150 may also be pre-positioned within a certain distance from a popular area, an area holding an event such as a concert or sporting event, an area where a likelihood of cash requests are high, or any other area. After receiving a consumer request for delivery of a payload present in one of the pre-loaded unmanned vehicles 150, control center 120 may select a pre-loaded unmanned vehicle 150 containing the requested payload and direct the selected unmanned vehicle 150 to travel to a consumer location for quick delivery In another example, a plurality of unmanned vehicles 150 may be present at a central location (e.g., financial institution 130) and ready for loading with a requested payload. Based on a determination that the payload is located at financial institution 130, control center 120 may communicate request data to financial institution 130. In some embodiments, control center 120 may communicate request data to a computing device of financial institution 130. One or more unmanned vehicles 150 may then be readied for loading of a payload into the chambers of the respective unmanned vehicles 150.

It should be noted that while control center 120 may receive customer requests and then dispatch unmanned vehicles 150 based on the customer requests, the customer requests may be sent directly to available unmanned vehicles 150 from client device 110 used by the consumer, such that unmanned vehicles 150 may be dispatched based on the received consumer requests.

At step 340, payload may be loaded into a chamber of unmanned vehicle 150. After unmanned vehicle 150 has been loaded with the requested payload, unmanned vehicle 150 may communicate with control center 120 to signal that unmanned vehicle has 150 been loaded with a requested payload.

In another example, financial institution 130 may gather the requested payload for loading into unmanned vehicle 150, and load the same into a chamber of unmanned vehicle 150. Financial institution 130 may then communicate with control center 120 to signal that unmanned vehicle 150 has been loaded with a requested payload.

At step 350, unmanned vehicle 150 may begin traveling to the delivery destination. During travel to the delivery location, control center 120 may be in communication with unmanned vehicle 150 and track location of unmanned vehicle 150. For example, control center 120 may send periodic status inquiry signals to unmanned vehicle 150. Unmanned vehicle 150 may respond to status inquiry signals by a response signal indicating location, speed, temperature, tampering event detection, and/or any other information relevant to the delivery.

Control center 120 may monitor travel of unmanned vehicle 150, and send command signals to unmanned vehicle 150 based on a status of unmanned vehicle 150. In one example, if a malfunction of unmanned vehicle 150 is determined, control center 120 may command unmanned vehicle 150 to return to the departure location, travel to a nearest maintenance location, or travel to another specified location. In another example, if a tampering event is detected, control center 120 may command unmanned vehicle 150 to adjust a payload state, self-destruct, or take evasive measures. Client devices 110 may also monitor travel of unmanned vehicle 150 and send command signals in the same manner as described above.

Unmanned vehicle 150 may also take actions based on its own determinations about its current state. In one example, if unmanned vehicle 150 detects that a tampering event or malfunction has occurred, and control center 120 is out of contact or fails to detect the tampering event or malfunction, unmanned vehicle 150 may direct itself to return to a departure location, travel to a nearest maintenance location, or travel to another specified location. In another example, if unmanned vehicle 150 detects that a tampering event or malfunction has occurred, and control center 120 is out of contact or fails to detect the tampering event or malfunction, unmanned vehicle 150 may direct itself to adjust a payload state, self-destruct, return to control center 120, alert local authorities (e.g., police department, sheriff's office, security guard, or other form of local law administration or enforcement), wait in place for further instruction from the customer (e.g., via client device 110) or other person/entity who is authorized to control unmanned vehicle 150, generate and/or transmit an alarm (e.g., send an alert message to client 110, flash a light, generate an alarm sound), or take evasive measures.

In some embodiments, if unmanned vehicle 150 detects that a tampering event or malfunction has occurred, and control center 120 is out of contact or fails to detect the tampering event or malfunction, unmanned vehicle 150 may choose an action based on the types of the detected tampering event or malfunction. For example, if the detected tampering event is an improper attempt by an unauthorized person to access the payload, unmanned vehicle 150 may destroy the payload, destruct unmanned vehicle 150 itself, and/or send an alert to local authorities. In contrast, if unmanned vehicle 150 detects a malfunction or loss of one or more capabilities of unmanned vehicle 150 (e.g., flat tire, loss of power to one or more components of the vehicle, etc.) with no detection of an improper attempt to access the payload or imminent danger to unmanned vehicle 150 (e.g., fire, flooding, etc.), unmanned vehicle 150 may conclude that payload is currently safe and needs not become immediately destroyed. Unmanned vehicle 150 may instead contact a repair technician, wait for rescue, and/or wait in place for further instruction.

In some embodiments, if unmanned vehicle 150 detects that a tampering event and/or malfunction has occurred, and control center 120 is out of contact and/or fails to provide instructions regarding the tampering event or malfunction, unmanned vehicle 150 may choose an action dependant on one or more characteristics of the payload and/or the severity of the detected tampering event/malfunction. For example, for payloads that are cheap and/or easy to be recreated, such as cashier's checks and/or debit cards, unmanned vehicle 150 may default to destroying the payload upon the detection of a tampering event or malfunction. If the payload is designated unique, valuable, or important, such as family heirlooms or a safe deposit box, unmanned vehicle 150 may be programmed not to destruct the payload in any situation, even during a theft. By leaving the payload intact, unmanned vehicle 150 leaves open the possibility of recovering a stolen payload, for example, if law enforcement later recovers the payload. Moreover, if the payload is cash, unmanned vehicle 150 may decide whether the cash should be destroyed based on the particular tampering event or malfunction. For example, when unmanned vehicle 150 merely has a flat tire, unmanned vehicle 150 may leave the cash intact. In contrast, when unmanned vehicle 150 detects that an unauthorized person attempts to retrieve the cash, unmanned vehicle 150 may flood the chamber containing the cash with ink.

In one example, unmanned vehicle 150 may be equipped with a cash dispensary, check printing capabilities, document production capabilities, and/or transaction card (credit card, debit card, etc.) production capabilities within or operably coupled to the chamber of unmanned vehicle 150. Thus, in some embodiments, unmanned vehicle 150 may produce a requested check, document, or card during travel to the delivery destination. In such a case, it may not be necessary to load unmanned vehicle 150 with the particular payload requested by the customer because unmanned vehicle 150 can produce the requested item itself from consumables that have been loaded previously. For example, unmanned vehicle 150 may be preloaded with blank check paper and print the requested check on the route to or on arrival at the delivery destination.

Unmanned vehicle 150 may also be in communication with a consumer's client device 110. The consumer may track the location of unmanned vehicle 150 and receive status information of unmanned vehicle 150. For example, client device 110 may receive status information of unmanned vehicle 150 comprising payload status, tampering event detection, speed, maintenance, time until delivery, and expected delivery time.

Client device 110 and unmanned vehicle 150 may also communicate with each other during travel to the delivery location. For example, when a delivery location is set to location-tracking delivery, the delivery location may be set as the consumer's current location communicated by client device 110 to unmanned vehicle 150. Unmanned vehicle 150 may adjust its travel route based on the received information about the consumer's location, and follow the consumer until the travel paths of the consumer and unmanned vehicle 150 meet, so that unmanned vehicle 150 can deliver the payload to the consumer. Furthermore, client device 110 may communicate with unmanned vehicle 150 before and during delivery to determine the estimated delivery time and present location of unmanned vehicle 150. Client device 110 may also communicate predictions as to a consumer's future delivery locations and consumer arrival time at such locations to unmanned vehicle 150. Client device 110 may also communicate an estimated time and location of a consumer along a user's travel path to the delivery location.

For example, based on data regarding a consumer appointment, reservation, or the like, client device 110 may transmit to unmanned vehicle 150 an estimated arrival time of a consumer at a delivery location. Unmanned vehicle 150 may then alter its delivery travel time or its travel path in order to reach the delivery location at the estimated arrival time. Unmanned vehicle 150 may also adjust its travel path to intersect or meet with a consumer's travel path based on the estimated times and locations of a consumer along a consumer travel path received from client device 110.

In another example, based on data regarding traveling speed of a consumer or a vehicle which the consumer is riding, distance of a consumer or consumer vehicle from a delivery location, and the like, client device 110 may transmit to unmanned vehicle 150 an estimated arrival time of a consumer at the delivery location. Unmanned vehicle 150 may then alter its delivery travel time or its travel path in order to reach the delivery location at the estimated arrival time. Unmanned vehicle 150 may also adjust its travel path to intersect or meet with a consumer's travel path based on the estimated times and locations of a consumer along a consumer travel path received from client device 110.

At step 360, unmanned vehicle 150 begins a delivery process and sends a notification to client device 110, another consumer device, or a device designated to receive notifications by the consumer, alerting that unmanned vehicle 150 is near the delivery location. Unmanned vehicle 150 may reach a predetermined distance within a delivery location, and may attempt to locate a convenient place to land, park, or dock. If a specified delivery location requested by a consumer is appropriate for landing, parking, or docking by unmanned vehicle 150, unmanned vehicle 150 may land, park, or dock at such location. If specified delivery location requested by a consumer is not appropriate, unmanned vehicle 150 may land, park, or dock in an appropriate location within a predetermined distance of the requested delivery location. For example, the predetermined distance may be a distance located a five-minute walk from the requested delivery location.

Appropriate delivery locations may be parking spaces, landing pads, docks, garages, stands, and the like, that provide a safe area in relation to humans, animals, and property for unmanned vehicle 150 to land, park, or dock. Appropriate delivery locations also include stations configured for battery charging, maintenance, and the like for unmanned vehicle 150. Control center 120 may maintain a database of appropriate delivery locations.

Unmanned vehicle 150 may display identifiers, such as identification numbers, specific colors, specific branding, or a consumer specific serial number to allow a consumer to recognize that unmanned vehicle 150 is the unmanned vehicle ordered by the consumer.

Once unmanned vehicle 150 has reached the delivery location, unmanned vehicle 150 waits for consumer interaction to initiate an authentication process.

At step 370, an authentication process may be initiated by unmanned vehicle 150. The authentication process may use profile information (including profile information associated with step 310) to verify consumer information. For example, a consumer may approach unmanned vehicle 150 and be prompted by unmanned vehicle 150 to enter one or a combination of a personal identification number, swipe a credit or debit card, have a picture taken, have a retina scanned, speak into a microphone, or take another action to verify the consumer. Based on this input information by the consumer, unmanned vehicle 150 may authenticate the consumer's identity.

In some examples, unmanned vehicle 150 may provide an initial authentication of the consumer's identity and thereafter confirm authentication with control center 120 before allowing access to payload. In other examples, unmanned vehicle 150 may send input authentication data to control center 120 that conducts identity verification. In still other examples, unmanned vehicle 150 may authenticate the consumer's identity based on information stored in local memory (not shown) or otherwise accessible to unmanned vehicle 150.

Control center 120 may confirm an identity based on input information provided by the consumer, camera images or video captured of the consumer by unmanned vehicle 150, or the like.

In some embodiments, remote authentication may be provided. For example, client device 110 may communicate with unmanned vehicle 150 via direct connection and/or network 140 to allow access to the payload. For example, a user may input authentication data into client device 110, and client device 110 may communicate input authentication data to unmanned vehicle 150 for authentication. Additionally or alternatively, input authentication data may be communicated to control center 120 for authentication. Once control center 120 authenticates the data sent by client device 110, control center 120 may command unmanned vehicle 150 to allow access to the payload.

For example, input authentication data may be fingerprint data input via a fingerprint reader or a camera of a consumer's client device 110. Input authentication data may be facial image data, credit card swipe data, voice data, heartbeat data, personal identification data, credit or debit card information, or the like.

At step 380, after identity of the consumer has been verified, chamber access may be granted. The chamber of unmanned vehicle 150 may open, unlock, or otherwise provide access to the payload housed inside.

Thereafter, unmanned vehicle 150 may close chamber and return to an unmanned vehicle dock, garage, landing pad, base, centralized location, or the like. For example, unmanned vehicle 150 may return to financial institution 130 or to control center 120, or may stay at its location until it is activated for another delivery. Unmanned vehicle 150 may fly, drive, or boat in a predetermined pattern and await activation for another delivery. Unmanned vehicle 150 may also stay at the delivery location and act as a general portable ATM, or any other kind of dispensary.

It should be noted that throughout process 300, control center 120 and financial institution 130 may both track location and status information of unmanned vehicle 150.

Figure 4:
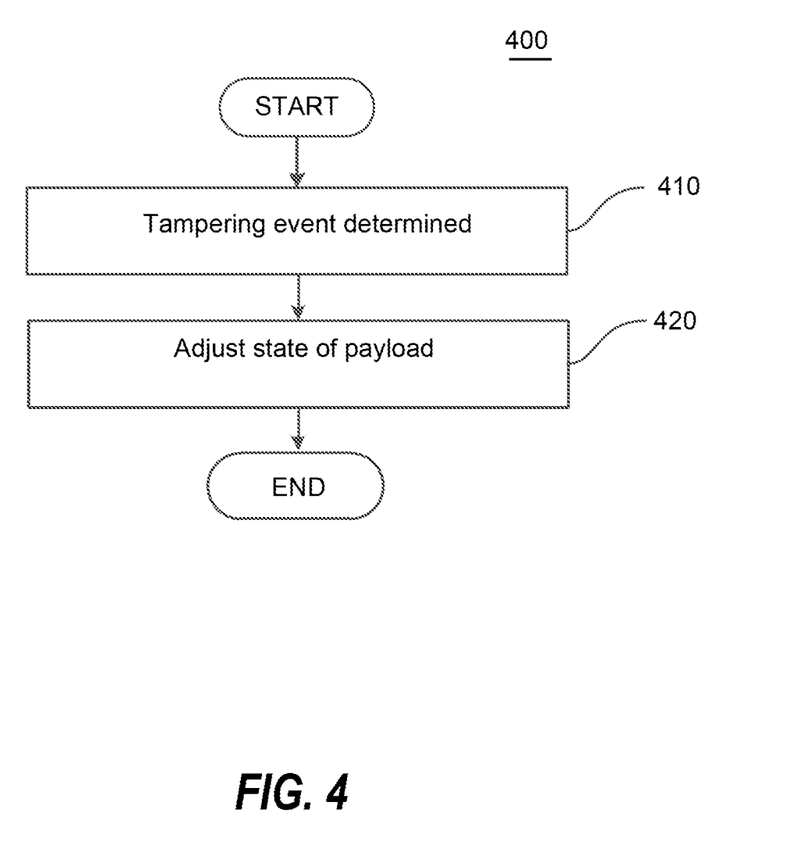
FIG. 4 is a flowchart of an exemplary tampering event process, consistent with disclosed embodiments.

FIG. 4 is a flowchart of an exemplary tampering event detection process 400, consistent with disclosed embodiments. Referring to FIG. 4, process 400 will be described in connection to system 100.

At step 410, a tampering event may be detected when unmanned vehicle 150 travels to a payload delivery location, or after unmanned vehicle 150 has arrived at a payload delivery location and is waiting for a consumer to access the payload. Unmanned vehicle 150 and/or control center 120 may detect a tampering event. When a tampering event is detected, the entity detecting the event may notify other components of system 100 of the tampering event in a status signal.

For example, during travel to a payload delivery location, a loss of altitude of unmanned vehicle 150 that meets or exceeds a predetermined threshold may be detected by a sensor of unmanned vehicle 150, identified by control center 120, or both. In such a case, the loss of altitude may be determined as a tampering event. As an example, aerial unmanned vehicle 150 may be shot down by a bullet or other missile, causing a sensor of unmanned vehicle 150 to identify a loss of altitude that meets or exceeds a predetermined threshold, triggering the detection of a tampering event.

In another example, a movement of unmanned vehicle 150 during travel to a payload delivery location that meets or exceeds a predetermined movement threshold may be detected by a sensor of unmanned vehicle 150, identified by control center 120, or both. In such a case, the movement may be determined as a tampering event. In another example, if a movement of unmanned vehicle 150 is constrained due to immobilization, movement may be sensed as being at or below a second predetermined threshold. In such a case, lack of movement may be detected as a tampering event.

In another example, divergence of unmanned vehicle 150 from a predetermined payload delivery travel route, predetermined vehicle speed, predetermined altitude, and the like, that meets or exceeds a threshold may be detected by a sensor of unmanned vehicle 150, identified by control center 120, or both. In such a case, the divergence may be determined as a tampering event. For example, if unmanned vehicle 150 is captured and transported off the predetermined payload delivery travel route, unmanned vehicle 150 and/or control center 120 may identify the divergence as a tampering event.

In another example, a loss of communication between unmanned vehicle 150 and control center 120 may be recognized by unmanned vehicle 150, control center 120, or both. In such a case, the communication loss may be determined as a tampering event. As another example, if communication is lost between control center 120 and unmanned vehicle 150 for at least a predetermined amount of time, a tampering event may be detected by a sensor of unmanned vehicle 150, identified by control center 120, or both.

For example, control center 120 may send periodic inquiry communication signals (e.g., ping) to unmanned vehicle 150, and wait for a communication response by unmanned vehicle 150 to each periodic inquiry within a predetermined period of time. If a response from unmanned vehicle 150 is not received within a predetermined period of time for each inquiry, control center 120 may detect that a tampering event has occurred. In such a case, control center 120 may attempt to reestablish communication with unmanned vehicle 150, or attempt back-up communication with unmanned vehicle 150 via peer-to-peer networks of unmanned vehicles 150. If communication is reestablished with unmanned vehicle 150, control center 120 may command a payload adjustment or self-destruction of unmanned vehicle 150, assuming unmanned vehicle 150 has not already taken such an action (e.g., adjusted or destroyed the payload) on its own accord.

When a tampering event has been detected by control center 120, control center 120 may direct an investigation vehicle to an estimated location or region of unmanned vehicle 150. The investigation vehicle may be manned or unmanned, and may be fitted with cameras, audio sensors, and other sensors in order to investigate and report to the control center 120 the status of the unmanned vehicle 150. Alternatively, control center 120 may alert the local authorities (e.g., police department, sheriff's office, security guard, or other form of local law administration or enforcement) about the suspected tampering event and the estimated location or region to investigate the tampering event.

In another example, unmanned vehicle 150 may send periodic inquiry communication signals to control center 120, and wait for a communication response by control center 120 to each periodic inquiry within a predetermined period of time. If a response from control center 120 is not received within a predetermined period of time for each inquiry, unmanned vehicle 150 may detect that a tampering event has occurred. After detection of the tampering event by unmanned vehicle 150, unmanned vehicle 150 adjusts the state of the payload or executes a self-destruction.

In another example, if communication between unmanned vehicle 150 and control center 120 is dormant for a predetermined period of time, or is determined to be erroneous or different when compared to standard communications, a tampering event may be detected. For example, control center 120 may detect that a tampering event has occurred if unmanned vehicle 150 fails to provide a predetermined number of consecutive periodic updates to its location or other periodically provided status information.

In another example, a power loss of unmanned vehicle 150 may be detected by unmanned vehicle 150 (via, e.g., an uninterruptible power supply configured to supply power to vital vehicle components), identified by control center 120 for unmanned vehicle 150, or both. In such a case, the power loss may be determined as a tampering event.

In another example, damage to unmanned vehicle 150, a part failure, or a computer system failure may be detected. In such a case, the damage, part failure, or computer system failure may be determined as a tampering event.

Unmanned vehicle 150 and/or control center 120 may also detect occurrence of a tampering event after unmanned vehicle 150 has reached a delivery location. For example, when a predetermined number of failed authentication events is met or exceeded, a tampering event may be detected by unmanned vehicle 150 or control center 120.

Further, if attempts to pry open the chamber or otherwise cause damage to unmanned vehicle 150 is sensed by impact sensors, cameras, pressure sensors, light sensors, and/or the like, a tampering event may be detected by unmanned vehicle 150 or control center 120.

At step 420, when a tampering event is detected, unmanned vehicle 150 may adjust a state of the payload. In some embodiments where control center 120 detects a tampering event, control center 120 may send a command communication signal to unmanned vehicle 150 to command adjustment of the payload state.

For example, adjusting the payload state may comprise destroying the payload by burning or shredding the payload, or marking or dying the payload with ink or other stain. Marking the payload may include exploding an ink pack or stain bomb in the chamber, for example. Adjusting the payload state may comprise stamping VOID on the payload or other lettering or words. When the payload is a credit card, debit card, an access card or credential with a magnetized strip, or the like, adjusting the payload state may comprise voiding or deactivating the card by, for example, demagnetizing the card.

In another example, credit cards, debit cards, access cards credentials, and the like may be voided and disabled by control center 120 and/or unmanned vehicle 150 when a tampering event is detected by a communication sent to a financial institution/card issuer that commands disabling.

A consumer may request that credit cards, debit cards, access cards credentials, and the like be voided and disabled by control center 120 and/or unmanned vehicle 150 during delivery. The consumer's request may be communicated via client device 110.

In another example, credit cards, debit cards, access cards credentials, and the like may be inactive during delivery by unmanned vehicle 150, and only become activated once authorization to access the chamber is granted. Once authorization is gained, credit cards, debit cards, access cards credentials, and the like may be activated by control center 120 and/or unmanned vehicle 150 by a communication sent to a financial institution/card issuer that commands activation.

Adjustment of payload state may occur in real-time after determination of the tampering event. It should be noted that client device 110 may perform any of the features, including determinations, commands, and directions, described above in regard to control center 120.

In some embodiments where control center 120 detects a tampering event, control center 120 may also instruct unmanned vehicle 150 to take actions other than adjusting the payload states. For example, instead of destroying the payload, control center 120 may instruct unmanned vehicle 150 to return to control center 120, to stay in the same place to wait for the arrival of repair technician or rescue team, or to generate an alarm (e.g., flash a light, generate an alarm sound, etc.). Control center 120 may also alert local authorities about the tampering event and request the local authorities to investigate the tampering event.

Figure 5:
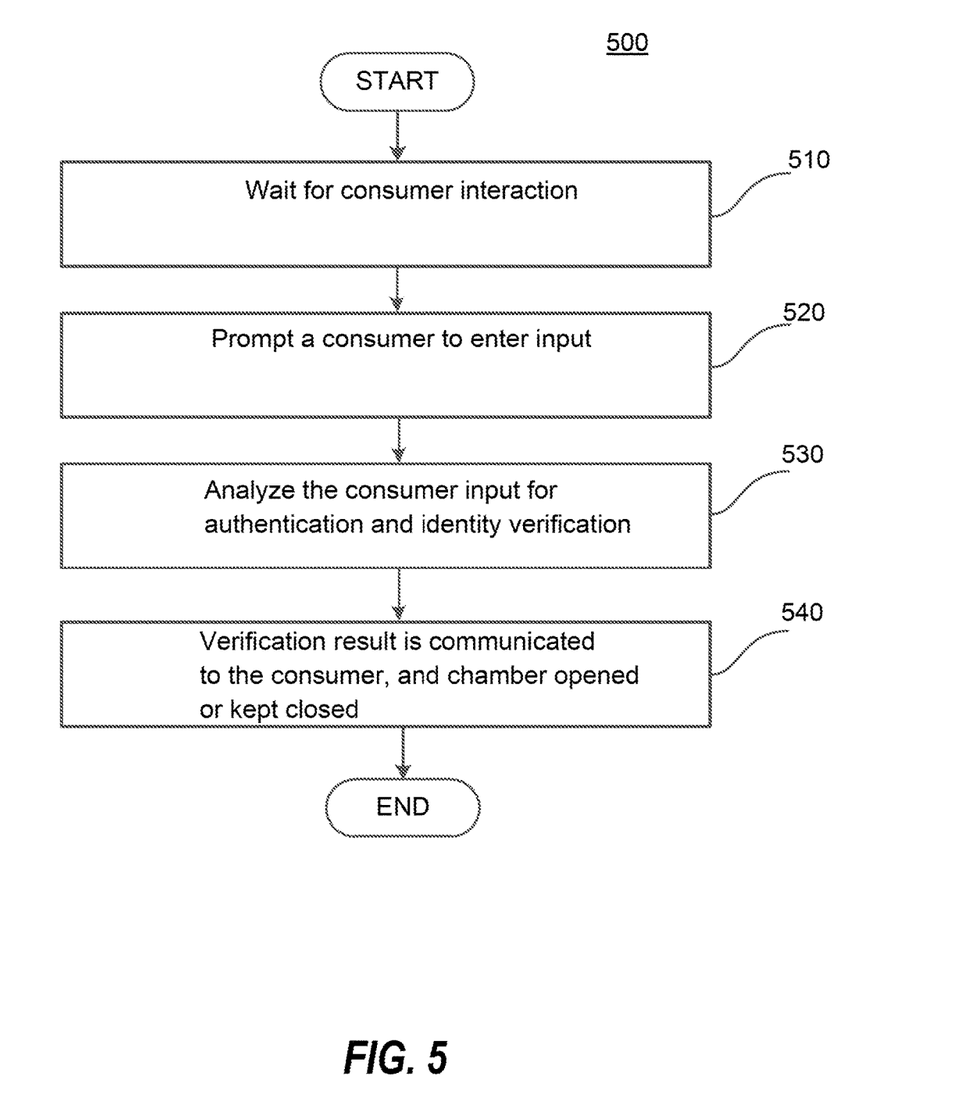
FIG. 5 is a flowchart of an exemplary authentication process, consistent with disclosed embodiments.

FIG. 5 is a flowchart of an exemplary authentication process 500, consistent with disclosed embodiments. Referring to FIG. 5, process 500 will be described in connection to system 100. Unmanned vehicle 150 may have profile data stored locally for authenticating input data from a consumer. Alternatively, profile data may be stored at control center 120.

At step 510, after arrival at a delivery location, unmanned vehicle 150 may wait for consumer interaction or input to begin the authentication process. Waiting for consumer interaction may comprise waiting for a consumer to enter a predetermined radius of unmanned vehicle 150, input data into unmanned vehicle 150, or the like.

At step 520, unmanned vehicle 150 may prompt a consumer to enter input data for authentication. For example, using cameras, motion sensors, or the like, unmanned vehicle 150 may determine that a person has approached unmanned vehicle 150 to attempt authentication, and may prompt the person to authenticate his or her identify. For example, unmanned vehicle 150 may prompt a consumer to enter personal information and/or swipe their credit or debit card. Unmanned vehicle 150 may prompt a consumer to position themselves for a camera of unmanned vehicle 150 to take their picture. Unmanned vehicle 150 may prompt a consumer to speak into a microphone to authenticate using voice recognition. Unmanned vehicle 150 may prompt a consumer to swipe his or her fingerprint using a fingerprint scanner on unmanned vehicle 150 to access the payload.

In other examples, unmanned vehicle 150 may not prompt any input, and a consumer may merely provide one or more of the inputs to unmanned vehicle 150 for authentication.

At step 530, unmanned vehicle 150 may analyze the consumer input for authentication and identity verification. For example, the authentication system of unmanned vehicle 150 may compare the one or more inputs to a consumer's profile data. In other examples, input data may be communicated to control center 120 and compared to a consumer's profile data. Comparison may be based on threshold calculations, where if a match percentage between input data and profile data is above a predetermined threshold, a consumer identity is verified. A result of the authentication may be transmitted from control center 120 to unmanned vehicle 150, or calculated at unmanned vehicle 150.

At step 540, a verification result is communicated to the consumer. In one example, a verification result may be communicated by a display screen, noise, or by activation of the chamber opening to reveal the payload. After a verification result is communicated to the consumer, the chamber of unmanned vehicle 150 may open, unlock, or otherwise allow or provide access to the payload housed inside.

It should be noted that authentication may also take place solely on a client device of the consumer. For example, the consumer may provide authentication input into client device 110, and gain an indication of authentication success via a verification result communicated by a display screen or speaker of client device 110.

In other examples, a consumer may not be physically located near unmanned vehicle 150 at the delivery location, but may still remotely input authentication data into client device 110. For example, if a consumer is delivering an item to another person, consumer may request delivery to the person but remotely authenticate the identity of the person to allow the person to access the payload.

The input may be communicated to control center 120 and verified by control center 120. A verification result may be communicated to client device 110, and a communication to unmanned vehicle 150 may unlock, payload may open, unlock, or otherwise provide access to the payload housed inside the chamber.

Payload may also be accessed by a user via proximity detection. For example, if a consumer has previously verified his identity and then approaches within a predetermined radius of unmanned vehicle 150, unmanned vehicle 150 may automatically verify the consumer's identity based on communication with the consumer's client device 110; a wearable (i.e., electronic device capable of being carried or worn by the customer), a chip embedded in the customer's clothes; a personal vehicle; or an implanted chip. Unmanned vehicle 150 may then unlock, payload may open, unlock, or otherwise provide access to the payload housed inside the chamber.

In some embodiments, communication between client device 110, control center 120, unmanned vehicle 150, financial institution 130, and other components and/or entities of system 100 may be secured and encrypted.

Unmanned vehicles 150 may be programmed, designed, and implemented to comply with appropriate security and travel guidelines in accordance with local laws where unmanned vehicle 150 is active.

Embodiments of the present disclosure may include chambers fitted into stationary housings, such as lockers, safety chests, drop-off locations, and the like, into which unmanned vehicle 150 could deposit a payload, and a consumer may provide authentication inputs to gain access to the chamber or authorize access via client device 110.

Embodiments of the present disclosure may also include locked chambers (e.g., safety box, locked container, etc.) being deposited at delivery locations, where a consumer may provide authentication inputs to an input device on the chamber or via client device 110, so as to retrieve contents in the chamber.

Embodiments of the present disclosure may also include delivery by unmanned vehicle 150 to another vehicle. For example, a consumer may be traveling in a moving vehicle, or located in a stationary vehicle, and may request delivery. Unmanned vehicle 150 may track the location of the moving or stationary vehicle of the consumer, and land and dock on it. Authentication may be implemented via communication between an on-board computer of the consumer's vehicle and unmanned vehicle 150. Unmanned vehicle 150 may be configured to deposit the payload into a chamber of the consumer's vehicle, deposit unmanned vehicle 150's chamber containing the payload into the consumer vehicle, or otherwise deposit unmanned vehicle 150's payload or chamber containing the payload into or onto the consumer's vehicle.

It should be noted that control center 120 may be configured to allow its operators to monitor unmanned vehicles 150. For example, the status of all unmanned vehicles 150 in a certain area or region may be presented to a control center operator on a graphical user interface. A status change shown on the interface may indicate a tampering event, unmanned vehicle malfunction, and the like.

Control center 120 may also be configured to allow complete or partial manual control of unmanned vehicles 150 by control center operators. For example, a control center operator may command adjustment of a payload state by the unmanned vehicle 150, self-destruction of unmanned vehicle 150, adjustment of a travel path of unmanned vehicle 150, or the like. Further, an operator may remotely control the travel path, speed, direction, altitude, and the like, of unmanned vehicle 150. When remote control of unmanned vehicle 150 is activated, a control center operator may access outputs provided by cameras, audio sensors, and the like of unmanned vehicle 150. Client device 110 may also perform complete or partial manual control of unmanned vehicles 150 in the same manner as performed by control center 120.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An unmanned vehicle for secure delivery configured to perform operations comprising:
   receiving instructions to travel to a delivery destination with a payload, the instructions based on a request for on-demand delivery associated with a user profile;
   traveling to the delivery destination with the payload;
   initiating an interaction with a person;
   conducting an authentication process comprising verifying an input provided by the person with information in the user profile associated with the request; and
   granting access to the payload following the verification process.

2. The unmanned vehicle for secure delivery of claim 1, wherein verifying the input comprises:
   transmitting, to a remote control center, a verification request comprising information associated with the input; and
   receiving, from the remote control center, a notification verifying the input.

3. The unmanned vehicle for secure delivery of claim 1, wherein initiating an interaction comprises:
   determining that a person has approached the unmanned vehicle; and
   prompting the person to enter personal information.

4. The unmanned vehicle for secure delivery of claim 3, wherein the determining is based on at least one of a camera input, a motion sensor input, a transaction card swipe, a fingerprint scan, a voice input, or a biometric input.

5. The unmanned vehicle for secure delivery of claim 3, wherein the prompting comprises at least one of a prompt to enter information using an interface, a prompt to swipe a transaction card, a prompt to position the user for a photograph, a prompt to speak into a microphone, or a prompt to scan a fingerprint.

6. The unmanned vehicle for secure delivery of claim 1, wherein verifying the input comprises:
   determining a match percentage between the input and the user profile; and
   verifying a user identity based on the match percentage and a predetermined match threshold.

7. The unmanned vehicle for secure delivery of claim 1, wherein verifying the input comprises:
   transmitting the input to a control center; and
   receiving, from the control center, a verification of a user identity based on a match percentage and a predetermined match threshold.

8. The unmanned vehicle for secure delivery of claim 1, wherein the person is not physically located near the unmanned vehicle, and granting access comprises granting access to another person.

9. The unmanned vehicle for secure delivery of claim 1, wherein granting access is based on a proximity detection of a device.

10. The unmanned vehicle of claim 9, wherein the device is one of a personal computer, a vehicle computer, a mobile device, a smart-watch, smart-spectacles, a tablet, a thin client, a wearable device, a chip embedded in clothing, a personal vehicle, or an implanted chip.

11. The unmanned vehicle for secure delivery of claim 1, the operations further comprising:
    transmitting, to a control center, a status while traveling to the delivery destination.

12. The unmanned vehicle for secure delivery of claim 11, wherein the transmitting causes the control center to detect a tampering event based on the status, and wherein the operations further comprise:
    receiving, from the control center, updated instruction to travel to a new destination; and
    traveling to the new destination.

13. The unmanned vehicle for secure delivery of claim 11, wherein the status comprises at least one of a location, a speed, a temperature, an indicator of a tampering event, an altitude, a payload state, or an indicator of a malfunction.

14. The unmanned vehicle for secure delivery of claim 1, the operations further comprising adjusting the payload state.

15. The unmanned vehicle for secure delivery of claim 14, wherein adjusting the payload state comprises marking the payload.

16. The unmanned vehicle for secure delivery of claim 1, the operations further comprising:
    detecting a tampering event based on at least one of detecting an attempt to pry open a chamber, detecting an attempt to damage the unmanned vehicle, or failing authentication a predetermined number of times; and
    performing at least one of adjusting a payload state, sending an alert to a control center, or traveling to a new destination.

17. The unmanned vehicle for secure delivery of claim 1, the operations further comprising:
    performing at least one of dispensing cash, printing a check, printing a document, or producing a transaction card.

18. The unmanned vehicle for secure delivery of claim 1, wherein:
    the request further comprises a request for location-tracking delivery; and
    the delivery destination is based on the location of a device.

19. A method for secure delivery by an unmanned vehicle comprising:
- receiving, by the unmanned vehicle, instructions to travel to a delivery destination with a payload, the instructions based on a request associated with a user profile;
- traveling, by the unmanned vehicle, to the delivery destination with the payload;
- initiating, by the unmanned vehicle, an interaction with a person;
- conducting, by the unmanned vehicle, an authentication process comprising verifying an input provided by the person with information in the user profile associated with the request; and
- granting, by the unmanned vehicle, access to the payload following the verification process.

20. A system for secure delivery by an unmanned vehicle comprising:
- a memory for storing instructions for secure delivery via unmanned vehicles;
- a processor configured to execute the stored instructions to:
  - create a user profile;
  - receive a request for on-demand delivery of a payload, wherein the request is associated with the user profile;
  - transmit, to an unmanned vehicle, instructions to:
    - receive a payload from a loading location; and
    - travel to the location of another vehicle with the payload;
    - initiate an interaction with a component of the other vehicle;
    - dock on the other vehicle;
    - conduct an authentication process comprising verifying information provided by the user with the information in the user profile associated with the request; and
    - deliver the payload to another vehicle following the authentication process.

* * * * *